(12) United States Patent
Kray et al.

(10) Patent No.: US 11,242,763 B2
(45) Date of Patent: Feb. 8, 2022

(54) PLATFORM APPARATUS FOR PROPULSION ROTOR

(71) Applicant: General Electric Company, Schenectady, NY (US)

(72) Inventors: Nicholas Joseph Kray, Mason, OH (US); Andreas Mastorakis, St. Corona, CA (US); Manoj Kumar Jain, Bangalore (IN); Nagamohan Govinahalli Prabhakar, Bangalore (IN)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 16/166,602

(22) Filed: Oct. 22, 2018

(65) Prior Publication Data
US 2020/0123921 A1 Apr. 23, 2020

(51) Int. Cl.
*F01D 11/00* (2006.01)
*F01D 5/02* (2006.01)

(52) U.S. Cl.
CPC ............... *F01D 11/008* (2013.01); *F01D 5/02* (2013.01); *F05D 2220/36* (2013.01); *F05D 2240/80* (2013.01); *F05D 2250/75* (2013.01); *F05D 2300/603* (2013.01)

(58) Field of Classification Search
CPC ........ F01D 5/02; F01D 11/08; F05D 2220/36; F05D 2240/80; F05D 2250/75
See application file for complete search history.

(56) References Cited

U.S. PATENT DOCUMENTS

| 3,294,364 A * | 12/1966 | Stanley ................. F01D 11/008 416/219 R |
| 5,957,658 A | 9/1999 | Kasprow et al. |
| 6,217,283 B1 * | 4/2001 | Ravenhall ............... F01D 5/225 416/2 |
| 6,676,373 B2 | 1/2004 | Marlin et al. |
| 7,094,033 B2 | 8/2006 | Pauley et al. |
| 8,066,479 B2 * | 11/2011 | El-Aini ..................... F01D 5/26 416/1 |
| 8,297,931 B2 * | 10/2012 | Read ..................... F01D 11/008 416/215 |
| 8,348,604 B2 | 1/2013 | Henkle et al. |
| 8,714,932 B2 | 5/2014 | Noe et al. |
| 9,017,031 B2 | 4/2015 | Bottome |
| 9,145,784 B2 | 9/2015 | Evans et al. |
| 9,664,058 B2 | 5/2017 | Healy et al. |
| 9,896,949 B2 | 2/2018 | Robertson |
| 10,018,055 B2 | 7/2018 | Robertson |

(Continued)

*Primary Examiner* — Christopher R Legendre
(74) *Attorney, Agent, or Firm* — Dority & Manning, P.A.

(57) ABSTRACT

A platform for use between adjacent propulsion rotor airfoils joined to a rotor disk to provide an inner flowpath boundary includes: an axially extending I-beam supporting a radially outer skin having a flowpath surface; the I-beam including an inner I-flange disposed at an inner edge of an axially extending I-web, and an outer I-flange disposed at an outer edge of the I-web; the I-beam including a laterally-extending forward end flange at a forward end of the I-web, and a laterally-extending aft end flange at an aft end of the I-web; and the radially outer skin disposed on top of and joined to the radially outer I-flange such that the forward end flange and the aft end flange abut the outer skin.

18 Claims, 7 Drawing Sheets

(56) References Cited

U.S. PATENT DOCUMENTS

| | | |
|---|---|---|
| 2016/0222800 A1 | 8/2016 | Kelinow |
| 2017/0101876 A1* | 4/2017 | Wang .................... B29C 70/42 |
| 2018/0162102 A1 | 6/2018 | Stickler et al. |
| 2018/0171805 A1 | 6/2018 | Freeman et al. |
| 2018/0283187 A1* | 10/2018 | Kray .................... F01D 11/008 |
| 2020/0123921 A1* | 4/2020 | Kray .................... F01D 11/008 |

* cited by examiner

US 11,242,763 B2

PLATFORM APPARATUS FOR PROPULSION ROTOR

BACKGROUND OF THE INVENTION

The present invention relates generally to aircraft propulsion, and more particularly to airflow platforms disposed between adjacent rotor blades in aircraft engines.

A turbofan gas turbine engine used for powering an aircraft in flight typically includes, in serial flow communication, a fan assembly, a low-pressure compressor or booster, a high-pressure compressor, a combustor, a high-pressure turbine, and a low-pressure turbine. The combustor generates combustion gases that are channeled in succession to the high-pressure turbine where they are expanded to drive the high-pressure turbine, and then to the low-pressure turbine where they are further expanded to drive the low-pressure turbine. The high-pressure turbine is drivingly connected to the high-pressure compressor via a first rotor shaft, and the low-pressure turbine is drivingly connected to both the fan assembly and the booster via a second rotor shaft.

The fan assembly includes a plurality of circumferentially spaced-apart fan blades extending radially outwardly from a rotor disk. During engine operation, ambient airflow is channeled between the rotating blades and pressurized thereby generating thrust for powering the aircraft in flight. A radially inner flowpath boundary for the airflow channeled between the blades is provided by fan platforms located between adjacent fan blades. A platform is a small component which acts as a "filler" between two adjacent gas turbine engine fan blades. The outer surface of the platform defines a portion of the generally conical shape of the flowpath between the two fan blades. The platform is physically attached to the rotor.

A common construction of platforms is a so-called "I-beam configuration". In this type of configuration, the platform is shaped like an I-beam. The web of the beam is oriented in a radial direction. One of the flanges of the beam is the flowpath surface, and the other flange is located inboard, adjacent the rotor. The forward and aft ends of the platforms are retained by continuous annular retention rings.

In operation, there is a significant radially outward centrifugal body load on the platform. Accordingly, the platform tends to deflect radially outward at the mid-chord location. It has been found that this deflection causes high axial stresses applied to the flowpath component due to the deflection of the I-beam portion.

BRIEF DESCRIPTION OF THE INVENTION

This problem is addressed by a platform for a turbomachinery rotor that includes an I-beam with inner and outer flanges and an outer skin defining a flowpath surface. The I-beam further includes end flanges which provide support to the outer skin.

According to one aspect of the technology described herein, a platform for use between adjacent propulsion rotor airfoils joined to a rotor disk to provide an inner flowpath boundary includes: an axially extending I-beam supporting a radially outer skin having a flowpath surface; the I-beam including an inner I-flange disposed at an inner edge of an axially extending I-web, and an outer I-flange disposed at an outer edge of the I-web; the I-beam including a laterally-extending forward end flange at a forward end of the I-web, and a laterally-extending aft end flange at an aft end of the I-web; and the radially outer skin disposed on top of and joined to the radially outer I-flange such that the forward end flange and the aft end flange abut the outer skin.

According to another aspect of the technology described herein, a propulsion rotor assembly includes: a plurality of circumferentially spaced apart rotor blades extending radially outwardly from a rotor disk, a platform between each adjacent pair of the blades and joined to the rotor disk, each platform including: an axially extending I-beam supporting a radially outer skin having a flowpath surface; the I-beam including an inner I-flange disposed at an inner edge of an axially extending I-web, and an outer I-flange disposed and an outer edge of the I-web; the I-beam including a laterally-extending forward end flange at a forward end of the I-web, and a laterally-extending aft end flange at an aft end of the I-web; and the radially outer skin disposed on top of and joined to the radially outer I-flange such that the forward end flange and the aft end flange abut the outer skin.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
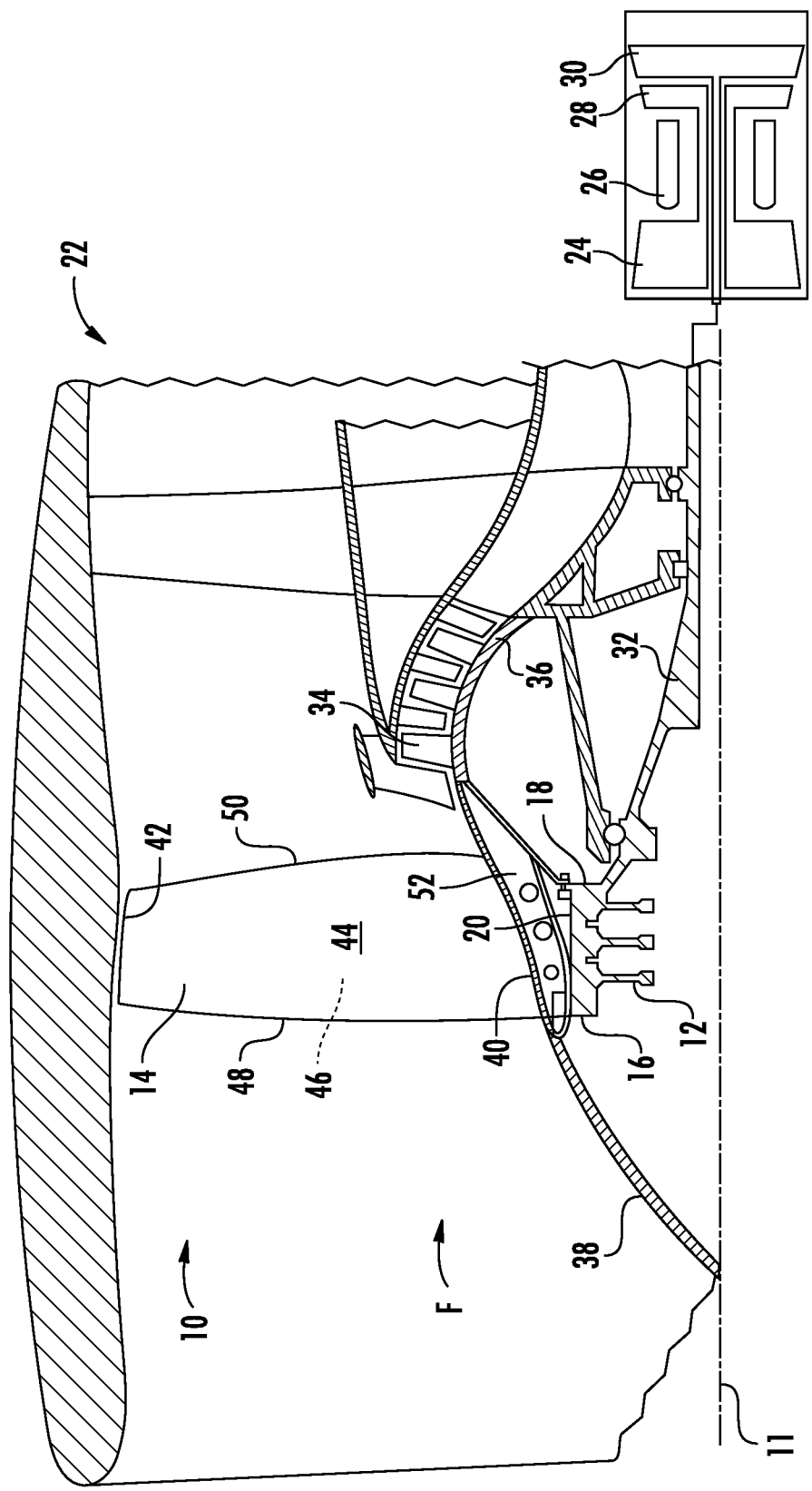
FIG. 1 is a schematic cross-sectional view of a gas turbine engine including a fan assembly with a platform.

Referring to the drawings wherein identical reference numerals denote the same elements throughout the various views, FIG. 1 shows an exemplary fan assembly 10 used for powering an aircraft in flight. The fan assembly 10 includes a rotor disk 12 mounted for rotation about a centerline axis 11. A plurality of circumferentially spaced apart fan blades 14 extend radially outward from the rotor disk 12 (only one fan blade 14 is shown in FIG. 1). The rotor disk 12 includes axially spaced-apart forward and aft faces 16 and 18, respectively, and a radially outer surface 20 extending therebetween.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The fan assembly 10 is coupled to a prime mover. The prime mover may be any device operable to rotate the fan assembly 10 at a required speed under expected mechanical and aerodynamic loads. Nonlimiting examples of prime movers include heat engines, motors (e.g. electric, hydraulic, or pneumatic), or combinations thereof (for example electric hybrid drivetrains). In the illustrated example, the fan assembly 10 is incorporated into a turbofan engine 22, which is a type of a gas turbine engine including in serial flow communication a high-pressure compressor 24, a combustor 26, a high-pressure turbine 28, and a low-pressure turbine 30. The low-pressure turbine 30 drives the fan assembly 10 via a fan shaft 32.

The fan assembly 10 shown in FIG. 1 is generically representative of any "propulsion rotor" including a rotatable rotor disk carrying a plurality of airfoils. The principles described herein are applicable to any such propulsion rotor, such as propellers, ducted fans, unducted fans, and/or compressors. The principles described herein are applicable to propulsion rotors having separate airfoils as well as integrally-bladed rotors or "blisks".

Disposed downstream of the fan assembly 10 is a conventional low-pressure compressor or "booster" 34 having axially spaced apart vane and blade rows, with the blades thereof being joined to a booster spool or shaft 36. The booster shaft 36 is suitably coupled to the rotor disk aft face 18. A generally conical spinner 38 is joined to the rotor disk 12 to provide an aerodynamic flow path for air flow F entering the fan assembly 10.

Each fan blade 14 extends from a root 40 to a tip 42, and includes a generally concave pressure side 44, joined to a generally convex suction side 46 at a leading edge 48 and a trailing edge 50. The fan blades 14 may be made from suitable high strength materials such as metal alloys (e.g. iron, nickel, or titanium alloys) or composite materials, such as carbon reinforcing fibers in an epoxy matrix, with or without metallic shielding. When the fan blades 14 are assembled to the rotor disk 12, spaces are defined between the adjacent fan blades 14.

A plurality of platforms 52 (only one shown in FIG. 1) are provided between the fan blades 14 with each platform 52 being disposed between respective adjacent ones of the fan blades 14 and radially outwardly from the rotor disk 12.

Figure 2:
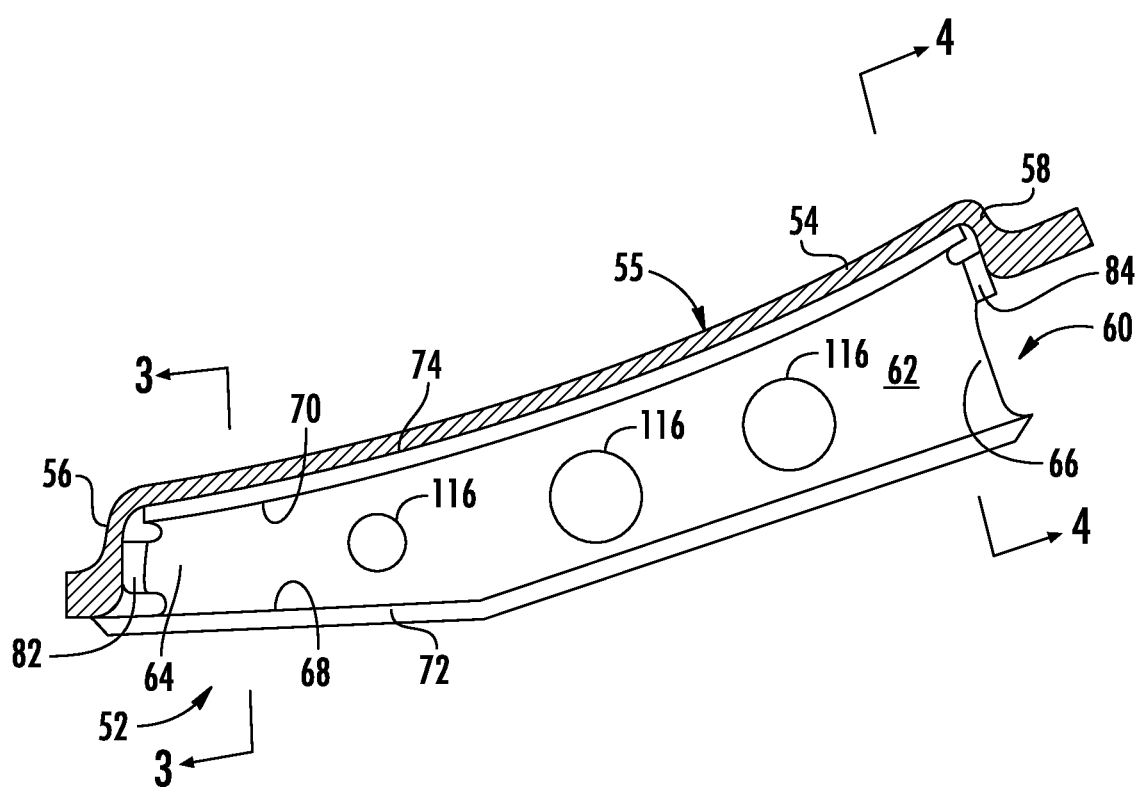
FIG. 2 is an enlarged view of a portion of the fan assembly of FIG. 1, showing the platform in more detail.
Figure 3:
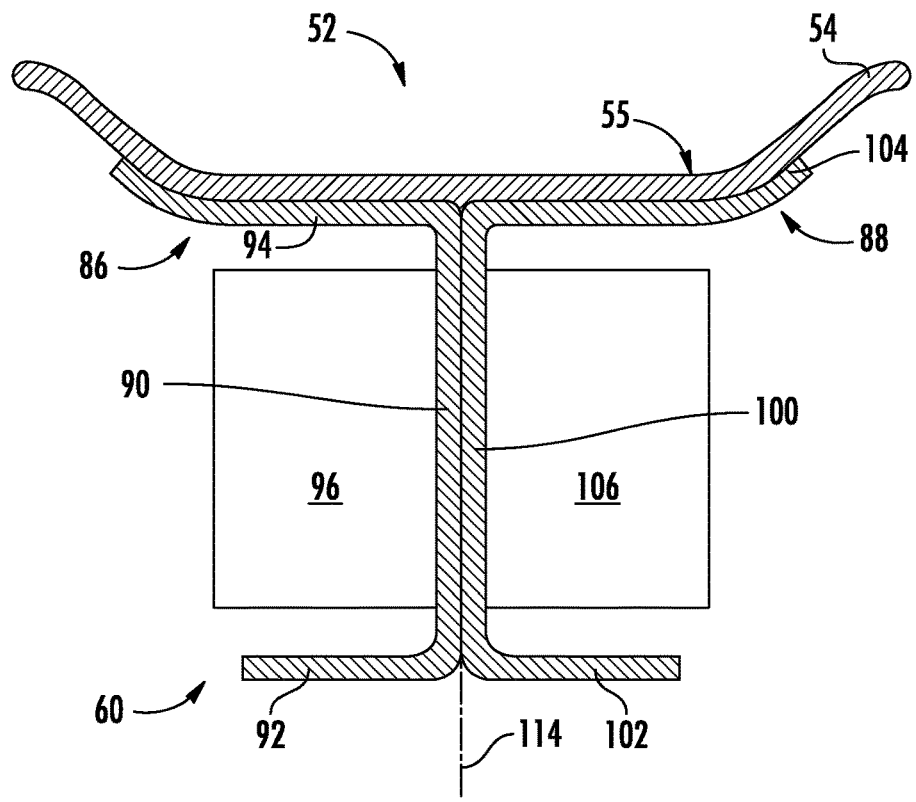
FIG. 3 is an axial aft looking forward cross-sectional view illustration of the fan blade platform through 3-3 in FIG. 2.
Figure 4:
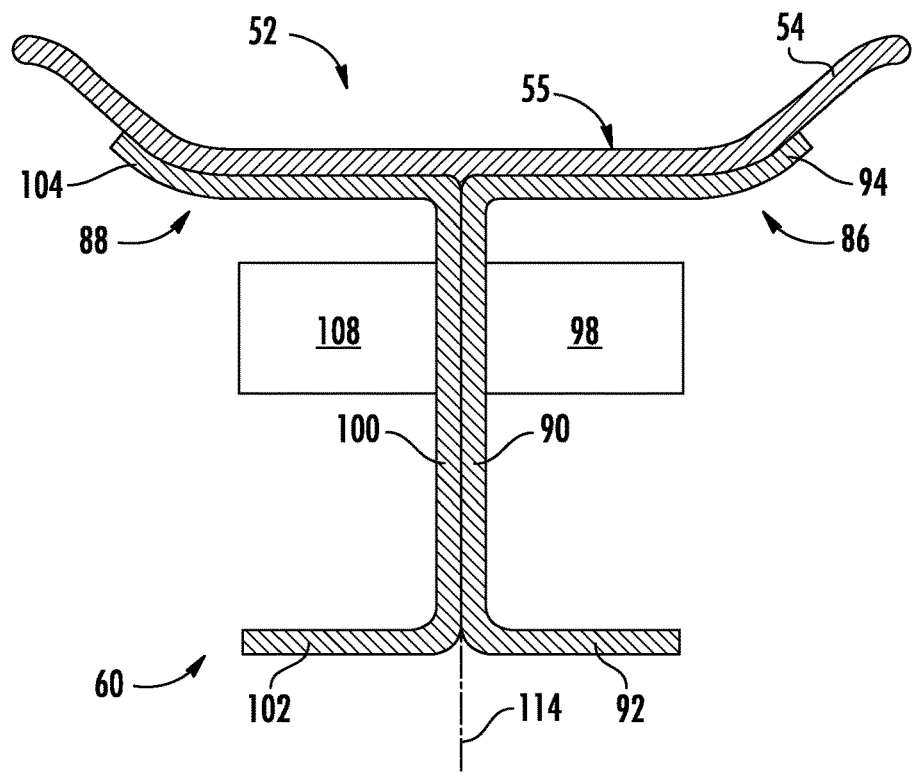
FIG. 4 is an axial forward looking aft cross-sectional view illustration of the fan blade platform through 4-4 in FIG. 2.

Referring to FIGS. 2-4, each of the platforms 52 has a top or outer skin 54 having a top or radially outer surface 55 extending between the respective adjacent fan blades 14 so as to collectively define an inner flowpath boundary for channeling air flow F between the fan blades 14. The outer skin 54 includes forward and aft end walls 56, 58 at its axially forward and aft ends respectively. The forward and aft end walls 56, 58 may extend generally parallel to the radial direction.

Referring to FIGS. 2-4, each of the platforms 52 includes an axially extending I-beam 60 supporting the outer skin 54. The I-beam 60 includes an I-web 62 extending axially between forward and aft axial ends 64, 66 and radially between inner and outer edges 68, 70. The I-web 62 is disposed between and integrally formed and monolithic with inner and outer I-flanges 72, 74 at the inner and outer edges 68, 70 respectively. Alternatively, these may be referred to as lower and upper or first and second, I-flanges. The radially outer skin 54 sits on top of and is joined to the outer I-flange 74. As used herein, the term "join" or "joined" refers to two or more components having a secure physical connection to each other. Examples of suitable means for joining components include but are not limited to: mechanical fasteners, mechanical joints, bonding processes (e.g. thermal bonding, ultrasonic bonding, solvent welding), adhesives, or combinations thereof. In one example, the radially outer skin 54 is joined to the radially outer I-flange 74 using an adhesive.

Figure 5:
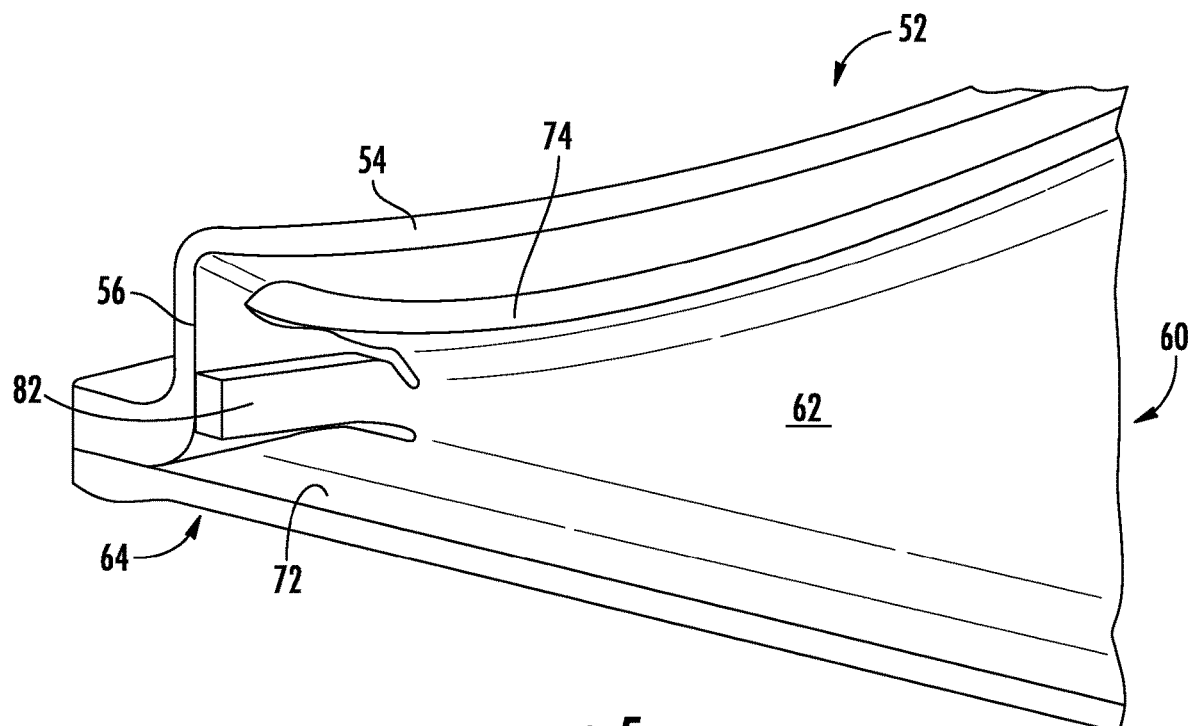
FIG. 5 is a schematic left-side perspective view of a portion of the platform.
Figure 6:
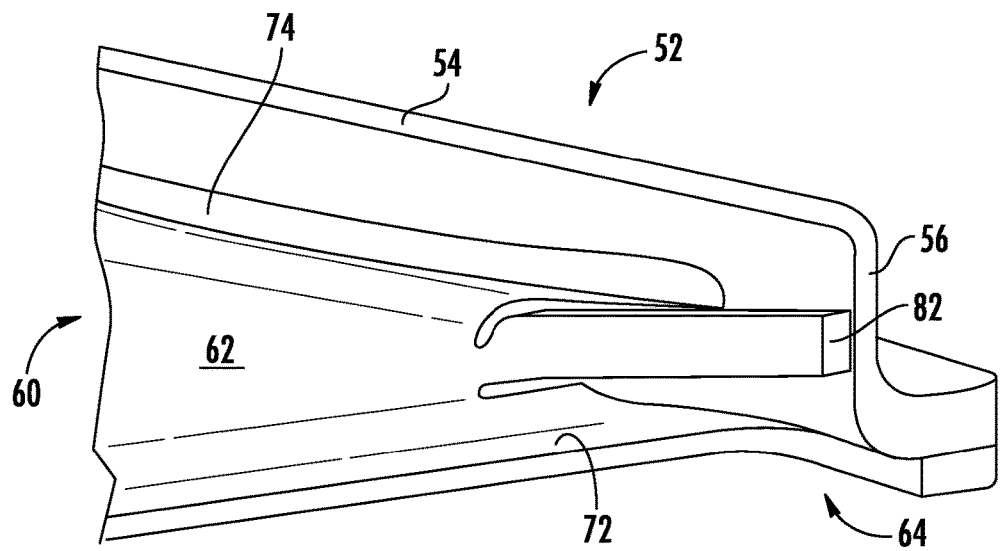
FIG. 6 is a schematic right-side perspective view of a portion of the platform.

The I-beam 60 includes forward and aft laterally-extending end flanges 82, 84, at the forward and aft axial ends 64, 66 of the I-web 62. These may be integrally formed and monolithic with the I-web 62. The forward end flange 82 is radially distanced from the outer I-flange 74 and a forward end of the inner I-flange 72, and the aft end flange 84 is radially distanced from the inner I-flange 72 and an aft end of the outer I-flange 74. As best seen in FIGS. 2, 5, and 6, the forward end wall 56 extends forward of the forward end flange 82 and the aft end wall 58 extends aft of the aft end flange 84 such that the forward and aft end flanges 82, 84 axially abut the forward and aft end walls 56, 58, respectively. The function of the end flanges 82, 84 is described in more detail below.

To reduce the overall weight of the platform 52 while maintaining suitable strength thereof, the I-beam 60 may be made from a non-metal, composite or thermoplastic material. For example, one suitable composite material would be graphite fibers embedded in an epoxy resin. The I-beam 60 may be an integral monolithic part or may be made from components joined together.

Referring to FIGS. 3 and 4, the I-beam 60 may be constructed from and include oppositely facing or back to back first and second C-beams 86, 88. The first C-beam 86 includes an axially extending first C-web 90 disposed between first inner and outer C-flanges 92, 94. The first C-beam 86 further includes laterally-extending first forward and aft end tabs 96, 98, at forward and aft axial ends, respectively of the first C-web 90. These may be integrally formed and monolithic with the first C-web 90.

The second C-beam 88 includes an axially extending second C-web 100 disposed between second inner and outer C-flanges 102, 104. The second C-beam 88 further includes laterally-extending second forward and aft end tabs 106, 108, at forward and aft axial ends, respectively of the second C-web 100. These may be integrally formed and monolithic with the second C-web 100.

The first and second C-beams 86, 88 open in opposite first and second circumferential or side directions and the first and second C-webs 90, 100 are back to back along a center plane or interface 114. The first and second C-webs 90, 100 may be joined together along the center plane 114. The outer I-flange 74 of the I-beam 60 includes or is formed by the first and second outer C-flanges 94, 104. The inner I-flange 72 includes or is formed by the first and second inner C-flanges 92, 102. The forward end flange 82 of the I-beam 60 includes or is formed by the first and second forward end tabs 96, 106. The aft end flange 84 of the I-beam 60 includes or is formed by the first and second aft end tabs 98, 108. The I-web 62 is formed from the first and second C-webs 90, 100.

The first and second C-beams 86, 88 may be formed by providing flat blanks of thermoplastic material, for example a composite material having chopped fibers, unidirectional reinforcing tape, or a combination thereof embedded in a thermoplastic polymer. The flat blanks can be formed between dies under heat and pressure using conventional methods to define the laterally-extending parts, i.e. the C-flanges and the end tabs, without complex multi-axis tooling.

To further reduce weight, a number of weight relief holes 116 may be formed in the I-web 62 or the first and second C-webs 90, 100 as illustrated in FIG. 2. The first and second C-beams 86, 88 may be symmetric about the center plane 114 as illustrated in FIG. 3. I-beams made from a non-metal, composite or thermoplastic material may have the weight relief holes 116 formed post curing.

Figure 7:
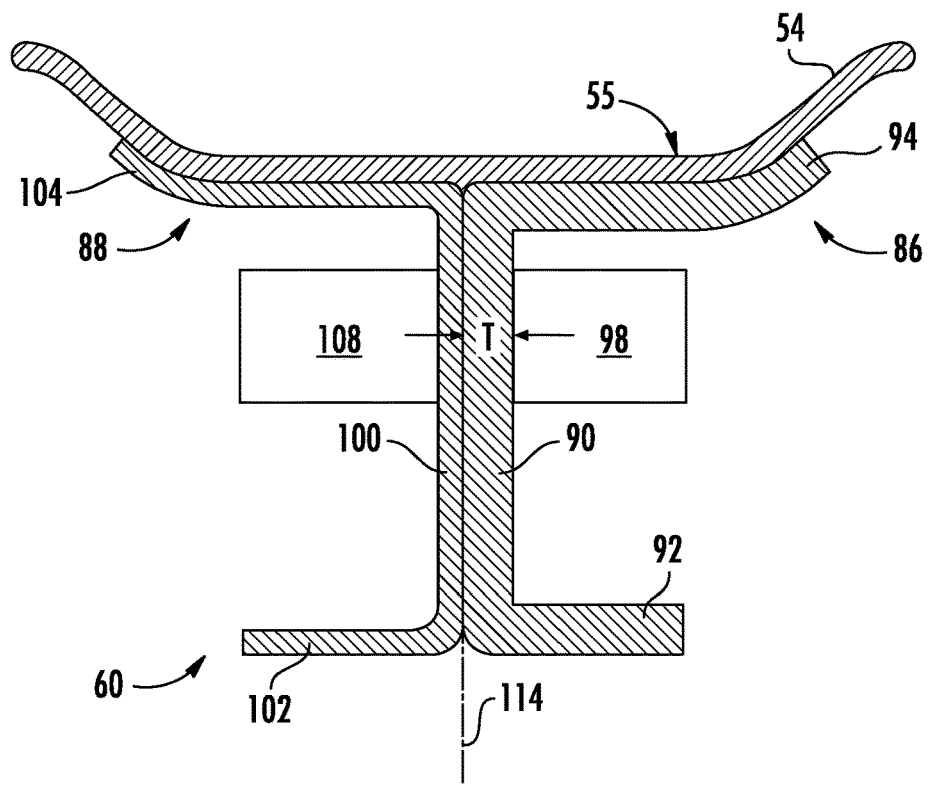
FIG. 7 is an axial forward looking aft cross-sectional view illustration of the fan blade platform formed with a first un-symmetric I-beam formed with a first C-beam thicker than a second C-beam.
Figure 8:
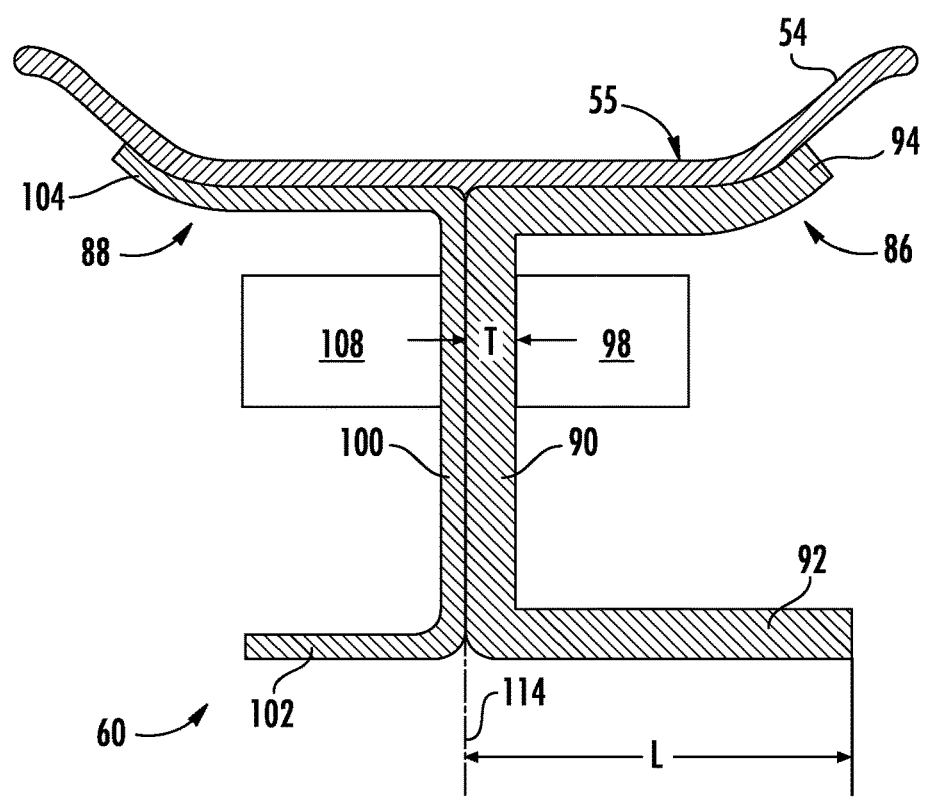
FIG. 8 is an axial forward looking aft cross-sectional view illustration of the fan blade platform formed with a second un-symmetric I-beam formed with a first C-beam having a lower C flange longer than that of a second C-beam.
Figure 9:
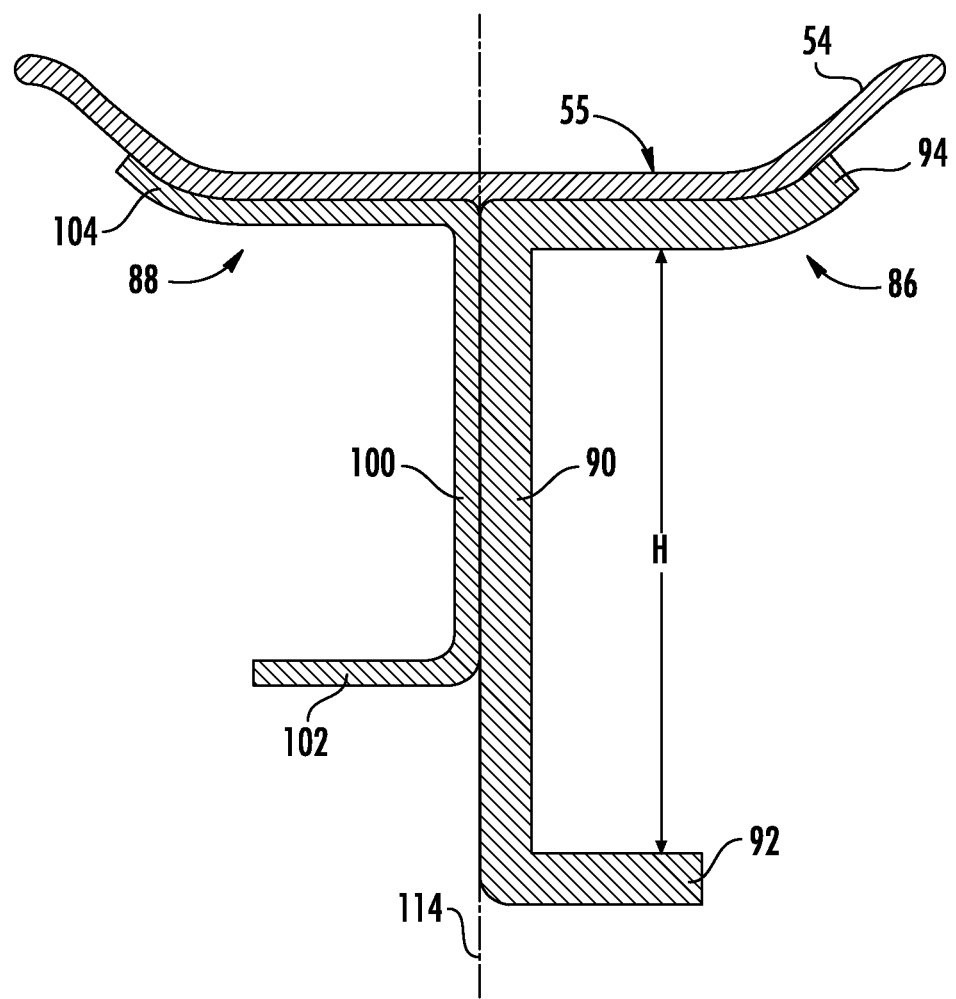
FIG. 9 is an axial forward looking aft cross-sectional view illustration of the fan blade platform formed with a third un-symmetric I-beam formed with a first C-beam having a C web larger than that of a second C-beam.

Alternatively, I-beam 60 may be asymmetrical about the center plane 114 of the I-web 62, as illustrated in FIGS. 7-9, to offset inherent torsional loading due to forward and aft axial offsets. The first and second C-beams 86, 88 may be asymmetric as illustrated in FIG. 7, having unequal or asymmetrical beam thicknesses "T" through the C-beam flanges and webs illustrated herein with the first C-beam being thicker than the second C-beam. The first and second C-beams 86, 88 may include unequal or asymmetrical I-beam thicknesses T of at least one of the axially extending first and second C-webs 90, 100, the first and second outer C-flanges 94, 104, and the first and second inner C-flanges 92, 102.

Alternatively, first and second C-beams 86, 88 in FIG. 8 have unequal or asymmetrical first and second inner C-flanges 92, 102. The first inner C-flange 92 is illustrated as being longer, indicated by length "L", than the second inner C-flange 102. The first and second C-beams 86, 88 in FIG. 9 have unequal or asymmetrical first and second C-webs 90, 100. The first C-web 90 is illustrated as being larger or higher, indicated by height "H", than the second C-web 100.

Figure 10:
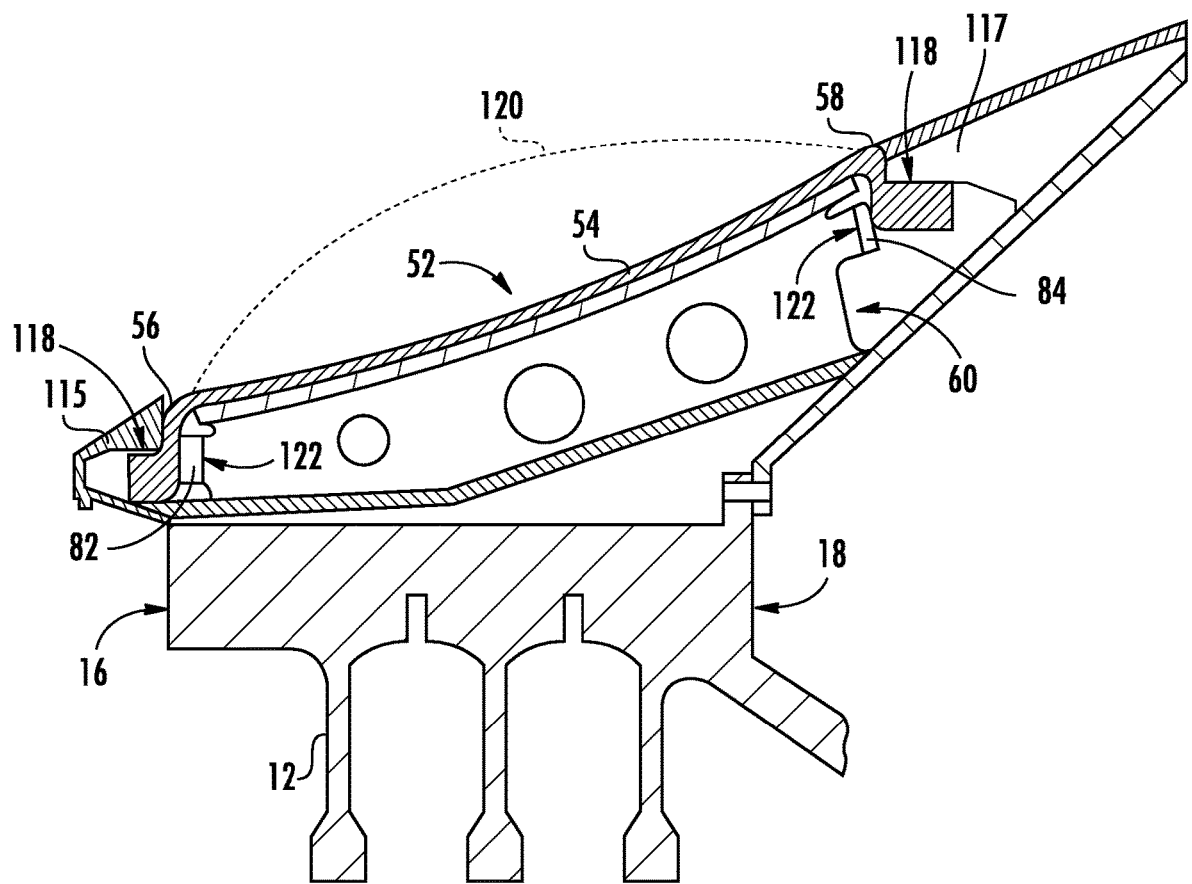
FIG. 10 is an enlarged cross-sectional view illustration of the fan blade platform mounted on a disk illustrated in FIG. 1.

In operation, there is a significant radially outward centrifugal body load on the platform 52. As shown in FIG. 10, it is restrained by conventional forward and aft retention rings 115, 117. Arrows 118 illustrate the direction of the reaction force applied by the retention rings 115, 117. Accordingly, the platform 52 tends to deflect radially outward at the mid-chord location. See the exaggerated curved shape depicted by a dashed line 120. It has been found that this deflection causes high axial stresses applied to the flowpath component due to the deflection of the I-beam portion (see arrows labeled 122). This ultimately creates high tensile stresses in the outer skin 54. The presence of the end flanges 82, 84 reduces stresses by providing a flat surface area to increase the contact surface area between the I-beam 60 and the outer skin 54 and thus decrease the stress for a given force.

As an alternative, it is physically possible to reduce the stress as described above by including a bulkhead, flat plate, or similar structure instead of the end flanges 82, 84. It is desired, however, to increase the surface area using material originating in the flat blank which is formed into the C-beams 86, 88. The blanks of material for the C-beams 86, 88 typically incorporate continuous reinforcing fibers running in the axial direction. While these fibers are not illustrated in the figures, it will be understood that they are internally embedded in the material in accordance with conventional practice. By forming the end tabs from the same material, the result is that reinforcing fibers run continuously from the C-web 90 through the first end tabs 96, 98, and similarly run continuously from the C-web 100 through the second end tabs 106, 108, thus ensuring good strength.

The platform apparatus described herein has advantages over the prior art. It will reduce platform stresses and consequently increase durability. It can be manufactured simply and economically.

The foregoing has described a platform apparatus for a propulsion rotor. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A platform for use between adjacent propulsion rotor airfoils joined to a rotor disk to provide an inner flowpath boundary, the platform comprising:
   an axially extending I-beam supporting a radially outer skin having a flowpath surface,
   wherein the I-beam includes an inner I-flange disposed at an inner edge of an axially extending I-web, and an outer I-flange disposed at an outer edge of the I-web,
   wherein the I-beam includes a forward end flange extending laterally outward from a forward end of the I-web at a location that is radially distanced from a forward end of the inner I-flange and the outer I-flange and an aft end flange extending laterally outward from an aft end of the I-web at a location that is radially distanced from the inner I-flange and an aft end of the outer I-flange,
   wherein the radially outer skin is disposed on top of and joined to the outer I-flange,
   wherein the radially outer skin includes a forward end wall extending forward of the forward end flange and an aft end wall extending aft of the aft end flange, and
   wherein the forward end flange axially abuts the forward end wall of the radially outer skin, and the aft end flange axially abuts the aft end wall of the radially outer skin.

2. The platform of claim 1, wherein the I-beam is a monolithic whole including the I-web, the inner and outer I-flanges, and the forward and aft end flanges.

3. The platform of claim 1, wherein the I-beam is made from a thermoplastic material.

4. The platform of claim 1, wherein the I-beam is made from a nonmetallic composite material.

5. The platform of claim 4, wherein the I-beam includes reinforcing material extending from the I-web into the forward and aft end flanges.

6. The platform of claim 1, wherein the I-beam includes back-to-back first and second C-beams joined to each other.

7. The platform of claim 6, wherein:
the first C-beam includes an axially extending first C-web disposed between first inner and outer C-flanges, and includes first forward and aft end tabs at axial ends thereof;
the second C-beam includes an axially extending second C-web disposed between inner and outer second C-flanges, and includes second forward and aft end tabs at axial ends thereof;
the first and second C-beams open in opposite first and second side directions; and
the first and second C-webs are disposed back-to-back along a planar interface.

8. The platform of claim 7, further comprising each of the first and second C-beams being a monolithic whole including the respective C-web, C-flanges, and end tabs.

9. The platform of claim 7, wherein each of the C-beams includes reinforcing material extending from the respective C-web into the respective forward and aft end tabs.

10. The platform of claim 6, wherein each of the C-beams is made from a thermoplastic material.

11. The platform of claim 6, wherein each of the C-beams is made from a nonmetallic composite material.

12. The platform of claim 1, wherein the I-beam is asymmetrical about a center plane of the I-web.

13. The platform of claim 1, further comprising weight relief holes disposed in the I-web.

14. A propulsion rotor assembly, comprising:
a plurality of circumferentially spaced apart rotor blades extending radially outwardly from a rotor disk,
a platform between each adjacent pair of the blades and joined to the rotor disk, each platform including:
an axially extending I-beam supporting a radially outer skin having a flowpath surface,
wherein the I-beam includes an inner I-flange disposed at an inner edge of an axially extending I-web, and an outer I-flange disposed at an outer edge of the I-web,
wherein the I-beam includes a forward end flange extending laterally outward from a forward end of the I-web at a location that is radially distanced from a forward end of the inner I-flange and the outer I-flange, and an aft end flange extending laterally outward from an aft end of the I-web at a location that is radially distanced from the inner I-flange and an aft end of the outer I-flange,
wherein the radially outer skin is disposed on top of and joined to the outer I-flange,
wherein the radially outer skin includes a forward end wall extending forward of the forward end flange and an aft end wall extending aft of the aft end flange, and
wherein the forward end flange axially abuts the forward end wall of the radially outer skin and the aft end flange axially abuts the aft end wall of the radially outer skin.

15. The assembly of claim 14, wherein:
the I-beam includes back-to-back first and second C-beams;
the first C-beam includes an axially extending first C-web disposed between first inner and outer C-flanges, and includes first forward and aft end tabs at axial ends thereof;
the second C-beam includes an axially extending second C-web disposed between inner and outer second C-flanges, and includes second forward and aft end tabs at axial ends thereof;
the first and second C-beams open in opposite first and second side directions; and
the first and second C-webs webs are disposed back-to-back and joined together along a planar interface.

16. The assembly of claim 15, further comprising each of the first and second C-beams being a monolithic whole including the respective C-web, C-flanges, and end tabs.

17. The assembly of claim 16, wherein each of the first and second C-beams is made from a nonmetallic composite material.

18. The assembly of claim 17, wherein each of the first and second C-beams includes reinforcing material extending from the respective C-web into the respective forward and aft end tabs.

* * * * *